United States Patent [19]

Morgan et al.

[11] Patent Number: 4,924,053
[45] Date of Patent: May 8, 1990

[54] ELECTRODE CARRYING WIRE FOR GTAW WELDING

[75] Inventors: Gene E. Morgan, Camarillo; Gerald E. Dyer, Canoga Park, both of Calif.

[73] Assignee: The United States of America as represented by the Administrator of the National Aeronautics and Space Administration, Washington, D.C.

[21] Appl. No.: 279,677

[22] Filed: Dec. 5, 1988

[51] Int. Cl.⁵ ............................................. B23K 9/24
[52] U.S. Cl. .................................... 219/75; 219/136
[58] Field of Search .................................. 219/75, 136

[56] References Cited

U.S. PATENT DOCUMENTS

| | | | |
|---|---|---|---|
| 3,612,807 | 10/1971 | Liefkens | 219/75 |
| 4,048,465 | 9/1977 | Manz | 219/75 |
| 4,543,461 | 9/1985 | Hill | 219/75 |

FOREIGN PATENT DOCUMENTS 53-37155  4/1978  Japan ..................................... 219/75

*Primary Examiner*—Clifford C. Shaw
*Attorney, Agent, or Firm*—William J. Sheehan; John R. Manning; Jerry L. Seemann

[57] ABSTRACT

A welding torch for gas tungsten arc welding apparatus has a hollow tungsten electrode including a ceramic liner and forms the filler metal wire guide. The wire is fed through the tungsten electrode thereby reducing the size of the torch to eliminate clearance problems which exist with external wire guides. Since the wire is preheated from the tungsten more wire may be fed into the weld puddle, and the wire will not oxidize because it is always within the shielding gas.

3 Claims, 1 Drawing Sheet

ELECTRODE CARRYING WIRE FOR GTAW WELDING

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention relates to gas tungsten arc welding (GTAW), and more particularly to a wire guide which extends through the tungsten electrode of gas tungsten arc welding apparatus.

Gas tungsten arc welding (GTAW) is a process wherein coalescence of metals is produced by heating them with an arc between an nonconsumable tungsten electrode and the work. A filler metal is utilized at least in those instances where the welding process is automatic or semi-automatic and where the base material to be welded is relatively thick, the filler material being a welding rod or wire which is conventionally fed through a conduit external of the gas nozzle which surrounds the tungsten electrode. Shielding of the electrode and the weld zone is obtained from an inert gas such as argon or helium which is fed through the nozzle so as to prevent oxidizing of the electrode, the filler wire and the weld material which would occur rapidly if exposed to air during welding. The GTAW process is especially useful for joining aluminum and magnesium which form refractory oxides, and also for the reactive metals such as titanium and zirconium. Because of the high quality weld provided for the above mentioned materials, the gas tungsten arc welding process is used extensively in the aircraft and aerospace industry.

One of the difficulties with the prior art GTAW apparatus is that the filler metal, which is in the form of a small diameter rod or wire, is fed through a guide which, as aforesaid, is external of the gas nozzle. Because of this outside clearance problems are encountered when welding confined portions of workpieces, and additionally in certain instances the wire may not be completely shielded by the shielding gas and becomes exposed to air so as to contaminate the weld metal thereby resulting in an improper weld.

SUMMARY OF THE INVENTION

Consequently, it is a primary object of the present invention to provide gas tungsten arc welding apparatus having a guide for the filler metal wire which is internal of the electrode housing.

It is another object of the present invention to provide a wire guide for gas tungsten arc welding apparatus which extends within the shielding gas nozzle so that the wire is always in the shielding gas.

It is a further object of the present invention to provide a filler metal wire guide for gas tungsten arc welding apparatus which is disposed within the tungsten electrode.

It is a still further object of the present invention to provide gas tungsten arc welding apparatus wherein the tungsten electrode is hollow and the filler metal wire guide is disposed within and fed through the electrode.

Accordingly, the present invention provides a welding torch for gas tungsten arc welding apparatus having the filler metal wire guide positioned within the welding torch cross sectional profile, the wire guide and the wire fed therethrough at all times being within the shielding gas envelope. This not only eliminates the outside clearance problems that exist with conventional external wire guides, but also eliminates exposure of the wire to an oxidizing environment.

In the preferred form of the invention the tungsten electrode is hollow, and the wire guide is formed from ceramic material and the wire is fed therethrough. Another advantage presented by this construction is that more wire can be fed to the weld puddle or pool of molten metal since the wire is pre-heated by the electrode. Also the welding torch can be made to travel in any direction without need to rotate the torch.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
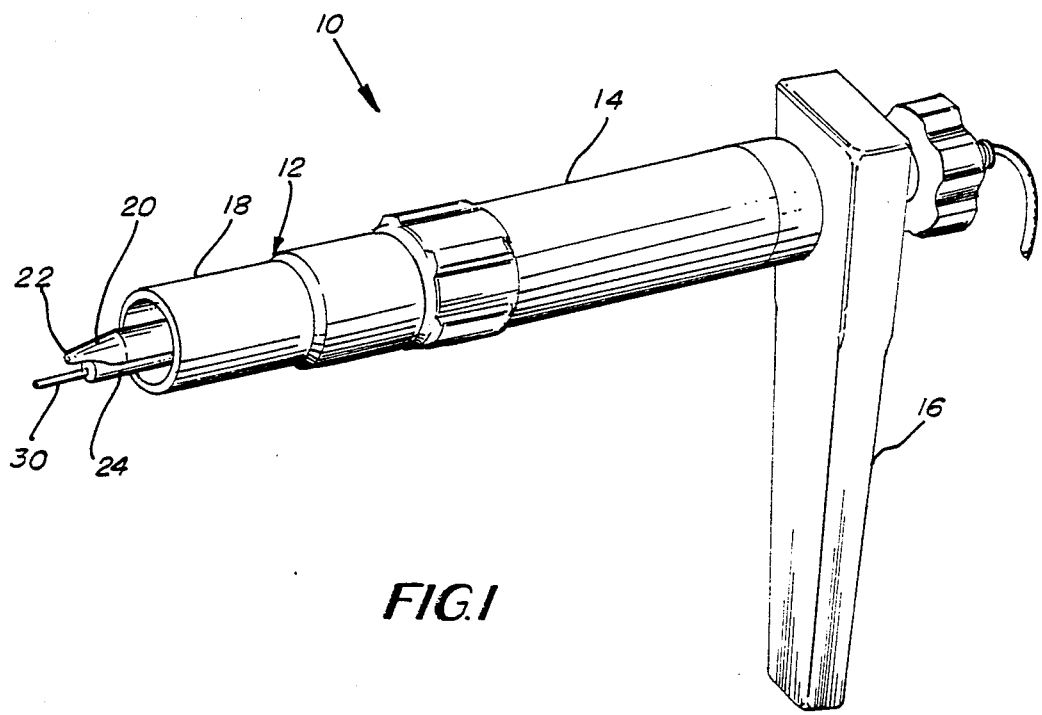
FIG. 1 is a perspective view of a gas tungsten arc welding apparatus having a wire guide constructed in accordance with the principles of the present invention.
Figure 2:
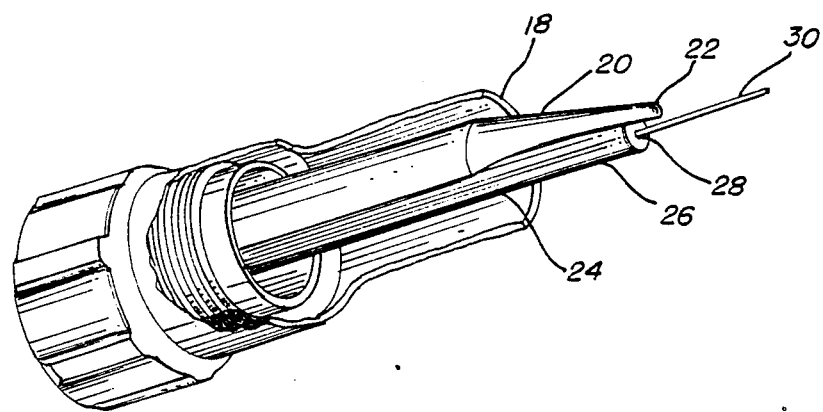
FIG. 2 is a fragmentary perspective view partly broken away illustrating the wire guide of the present invention within the welding torch.

Referring to the drawings, FIG. 1 illustrates gas tungsten arc welding apparatus 10 comprising a welding torch 12 carried by a housing 14 which may be supported by a holding member 16 or the like as is conventional. The torch 12 includes a nozzle 18 through which an inert shielding gas such as argon or helium or mixtures thereof is fed from a supply through a conduit extending through the housing 14, the nozzle 18 being disposed about a tungsten electrode 20 supplied from an electrical power source through an electrical conductor also extending through the housing 14.

The electrode 20 may be pure tungsten or tungsten alloy rod containing a small percentage of thoria or zirconia, the requirements for the electrode being specified in ASW A5.12, Specification For Tungsten Arc-Welding Electrodes. Thus, although the term tungsten is used herein, it should be understood that this term is not intended to be limited to pure tungsten, but includes all the known tungsten alloys conventionally used for GTAW electrodes.

Conventionally, a welding rod or wire is used as a filler metal during the GTAW process and such rod or wire is fed to the welding zone adjacent the tip 22 of the electrode 20 through a guide in the form of a conduit which is generally attached to the outside of the housing 14 and outside the nozzle 18. However, as aforesaid, such external guides may get in the way and present clearance problems when welding certain workpieces and also may expose portions of the wire to the environment outside the shielding gas thereby resulting in oxidation of the wire and thus a poor weld.

According to the principles of the present invention, the electrode 20 rather than being conventionally formed as a solid rod is formed with an axially extending bore 24 so that the electrode is hollow. An elongated ceramic cylindrical liner 26 is disposed within the bore 24, the liner having a central axially extending bore 28 which acts as a guide through which the rod or wire 30 is fed along the axis of the electrode 20. The ceramic material from which the liner or guide 26 is formed is conventional and acts to electrically insulate the wire from the electrode. The leading edge of the guide 26 terminates just behind the tip 22 of the electrode 20 so as not to interfere with the normal operation of the welding torch.

Since the wire is pre-heated by the electrode more wire may be fed to the weld puddle. Additionally, since the guide is disposed within the electrode which is within the nozzle 18, the wire is always within the envelope of the shielding gas so that problems resulting from oxidizing of the wire are eliminated.

Accordingly, the present invention overcomes certain of the difficulties encountered with prior art GTAW apparatus and has wide application for robotic and automatic GTAW processes since the torch can travel in any direction without necessitating rotation thereof.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. In a welding torch for gas tungsten arc welding apparatus comprising a housing for supporting an axially extending annular nozzle and an axially extending tungsten electrode, said electrode being disposed substantially coaxially within the nozzle and having a tip disposed outside said nozzle, means for supplying electricity to said electrode and means for supplying an inert gas to said nozzle for shielding said electrode from oxidizing conditions, the improvement comprising an axially extending bore formed through said electrode, and elongated non-electrified filler metal wire guide disposed within said bore terminating outside said nozzle and inwardly of said tip, said guide comprising a conduit of electrically insulated material through which a filler metal wire may be fed relatively to said electrode so that said filler material is not electrified by said guide or by said electrode.

2. In a welding torch as recited in claim 1, wherein said conduit is coaxially disposed within said electrode, and said wire is fed coaxially relatively to said electrode.

3. In a welding torch as recited in claim 1, wherein said conduit comprises ceramic.

* * * * *